United States Patent [19]

Sörensen

[11] 4,124,216
[45] Nov. 7, 1978

[54] PHONOGRAPH

[75] Inventor: N. Krebs Sörensen, Struer, Denmark

[73] Assignee: Bang and Olufsen A/S, Denmark

[21] Appl. No.: 578,186

[22] Filed: May 16, 1975

[30] Foreign Application Priority Data

May 16, 1974 [GB] United Kingdom ............... 21692/74

[51] Int. Cl.² .............................................. G11B 3/10
[52] U.S. Cl. ................................................ 274/23 A
[58] Field of Search ............................ 274/12, 23 A;
250/237 G

[56] References Cited

U.S. PATENT DOCUMENTS

| 2,056,372 | 10/1936 | Schwartz | 274/1 R |
| 3,276,315 | 10/1966 | Chalfin | 353/15 |
| 3,533,703 | 10/1970 | Wingate | 250/237 G |
| 3,540,739 | 11/1970 | Nakajima et al. | 274/10 R |
| 3,572,724 | 3/1971 | Rabinow | 274/23 A |
| 3,676,681 | 7/1972 | Kobayashi | 340/237 S |
| 3,701,534 | 10/1972 | Laue | 274/1 L |
| 3,856,401 | 12/1974 | Heitmann et al. | 250/237 G |

FOREIGN PATENT DOCUMENTS 2,054,880 11/1971 Fed. Rep. of Germany .......... 274/1 L Primary Examiner—Steven L. Stephan
Attorney, Agent, or Firm—Craig & Antonelli

[57] ABSTRACT

A detecting arrangement for a phonograph for non-mechanically detecting a tone arm reaching the outlet groove of a record. The detecting arrangement includes a first detector in the form of an elongated member movable in accordance with the movement of the tone arm and a second detector responsive to at least an increased movement of the member for generating pulse signals above a predetermined level to a detector unit which controls an operation of the phonograph.

26 Claims, 1 Drawing Figure

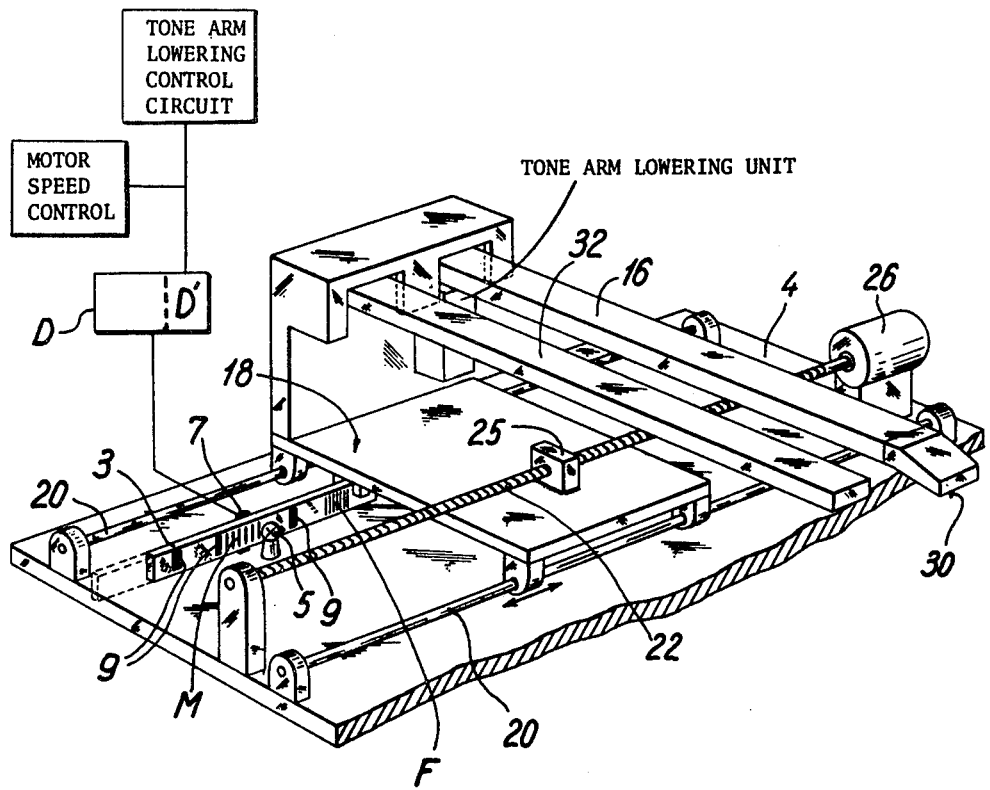

PHONOGRAPH

The present invention relates to a phonograph provided with means for detecting the tone arm reaching the outlet groove of a record and for effecting operation control in response to said detection, e.g. stoppage of the phonograph motor or raising and returning of the tone arm, said detecting means being adapted so as to respond to an increased speed of the tone arm motion relatively to the normal playing speed thereof. Usual records are made so as to have an outlet groove of increased pitch, whereby the tone arm is moved with increased velocity at the end of the record, and the said detector means are adapted to detect this velocity increase and thereby actuate the tone arm raising mechanism, whereafter further control means may be actuated for stopping the phonograph motor or for returning the tone arm to its initial position and then stopping the motor. In most of the known phonographs the detector means operate in a mechanical manner, but generally it is disadvantageous to make use of mechanical arrangements at this place.

In our earlier patent application Ser. No. 332,496 it has been suggested to detect the velocity increase by means of a photo electric arrangement whereby the increased velocity is detected as an increase of the light intensity on a photo sensor. Though with this arrangement the detection may be effected in an entirely non-mechanical manner the intensity level detection causes some troubles as far as adjustments and reliability are concerned.

It is the purpose of this invention to provide a phonograph in which the said outlet detection may be effected non-mechanically in a simple and reliable manner.

According to the invention the detecting means comprise an elongated member and a photoelectric sensor, the latter being arranged so as to pass along or be passed by the elongated member by the tone arm motion in the outlet groove area, the elongated member being prepared with a row of member portions of alternating light reflectability or transparancy in such a manner that the sensor receives a pulsating light signal during the tone arm movement, said sensor being connected to a detector unit operable to produce a control signal to said operation control effecting means in response to the pulse frequency of the pulsating signal increasing above a predetermined value by the relatively fast motion of the tone arm in said outlet groove. There will be a geometrically well defined relation between the velocity of the tone arm and the pulse frequency of the said pulsating signal, and in practice the increase of the pulse frequency in response to the tone head reaching the outlet groove is very easy to detect by means requiring little or no adjustment at all.

According to a further aspect of the invention the said elongated member and the sensor unit may be used not only for the outlet detection but additionally for localization detection of the tone arm in automatic phonographs, as will be described in more detail below.

In the following the invention is described in more detail with reference to the accompanying drawing which is a schematic perspective view of the tone arm unit of an automatic phonograph according to the invention.

Specific reference is also made to the said earlier patent application Ser. No. 332,496 which discloses a phonograph the tone arm of which is mounted on a parallelly displaceable carriage driven by a servo motor serving to displace the entire tone arm during the playing movement thereof. The tone arm is mounted on the carriage so as to be swingable in both horizontal and vertical direction, the vertical movement being controlled by a tone arm raising and lowering unit while the horizontal swinging of the tone arm is effected by the playing of a record, whereby an actual swinging or angular displacement of the tone arm relatively to the carriage causes a photoelectric device to actuate the said servo motor so as to move the carriage forwardly and thus cause the tone arm to swing back again relatively to the carriage. In this manner the carriage will follow the playing movement of the stylus of the tone arm and thus maintain the tone arm in a position substantially tangential to the sound groove portion being played.

The tone arm unit shown in the drawing forms part of a phonograph of the type described above. As in FIGS. 2 and 5 of the said earlier application the said carriage is designated 18, the tone arm 16, and the servo motor 26. The carriage 18 is slidably arranged on parallel guiding rods 20 secured to a chassis plate 4, and to the carriage is secured a nut 25 drivingly engaged by a screw spindle 22 driven by the motor 26. As mentioned the tone arm 16 is connected to the carriage 18 so as to be pivotal relatively thereto both vertically and horizontally, the vertical movement of the tone arm being controlled by a raising and lowering mechanism (not shown) and the horizontal movement thereof being effected by the playing of a record, the stylus of the tone arm being designated 30. Photo electric means (not shown, but disclosed in the said earlier application) are provided for detecting the horizontal swinging of the tone arm relatively to the carriage and for actuating the motor 26 so as to drive forwardly the carriage 18 until the tone arm 16 is swung back into its normal position relatively to the carriage 18. Thus, the carriage 18 generally follows the tone arm in its playing movement, and the movement of the carriage will be representative of the movement of the tone arm also when the stylus 30 enters the outlet groove of the record, whereby the speed of the movement will generally increase.

To the carriage 18 is secured another arm 32 at the outer end of which is mounted a photo electric unit for detecting the presence of the edge of a record resting on the turntable of the phonograph, as disclosed in more detail in the said earlier application.

According to the invention there is secured to the carriage 18 a forwardly protruding plate member 3 made of a light transparent material. Mounted on the chassis 4 supporting the carriage 18 is provided a lamp 5 at one side of the plate 3 and a photo diode 7 at the other side of the plate 3. The lamp and the photo diode are located so as to be situated adjacent an innermost area F of the plate 3 when the carriage 18 has reached a position corresponding to the outlet groove area of standard records. The plate area F is provided with a row of parallel lines made of a non-transparent material.

When the carriage 18 by the playing of a record has reached a position corresponding to the outlet groove area of the record the plate area F is introduced between the lamp 5 and the photo diode 7. Should the tone arm stylus not yet have reached the actual outlet groove of the record the carriage 18 and therewith the plate 3 will be moved either very slowly or in very short steps, whereby the photo diode 7 will supply electric impulses, caused by the passage of the said non-transparent lines, to a detector unit D, these impulses correspondingly being of either a low pulse frequency or a short pulse train duration. When thereafter the stylus enters the outlet groove of the record the carriage 18 will either increase its moving velocity or at least continue its motion in a non-intermittent manner, whereby the impulses produced by the photo diode 7 will get either an increased pulse frequency or the character of a continuous pulse train.

The detector unit D is adapted so as to be non-responsive to the pulses produced by the photo diode 7 during normal playing movement of the tone arm and the carriage 18, but responsive to either the increased pulse frequency or the non-intermittent pulse signal produced when the stylus has entered the outlet groove of the record. As known to those skilled in the art such a selective response is easily obtained e.g. by means of an integrator unit comprising a condensor which is charged by each impulse and discharged in a constant manner through a resistor. When the outlet groove is reached the increased number of pulses per time unit will serve to charge the condenser beyond its maximum charge during normal playing, whereby a control signal is produced and applied to the tone arm raising means. In this manner the increased moving speed of the tone arm at the end of the record is detectable in a very reliable manner.

It will be appreciated that the invention is of course not limited to phonographs in which the tone arm is mounted on a servo controlled carriage for parallel displacement of the tone arm, since the detector body 3 may be mounted directly associated with the tone head or the vertical shaft of a usual tone arm carrying out its entire playing movement by a rotation about a stationary shaft. In the latter case the detector body 3 may be shaped as a cylinder or an arched plate member.

In the phonograph according to the said prior application the carriage 18 is provided with a rigid switch actuator cooperating with a row of switches mounted on the carrier chassis 4, whereby different characteristic positions of the tone arm are electrically detectable by the detector portion D', primarily the initial and final start/stop position and the positions in which the tone arm is ready to be lowered into engagement with the inlet groove of records of various standard sizes by an output applied to the tone arm lowering circuit controlling the tone arm lowering unit. According to the present invention these different positions are electrically detectable by means of the photo sensor 7 and the detector body 3, when this body or plate is extended so as to cooperate with the light sensor along the entire movement range of the carriage 18, and when the detector body is prepared so as to make the photo sensor produce a characteristic change of its electric condition in response to the carriage 18 reaching each of the said different positions. In FIG. 1 these photo switch actuating areas of the extended detector plate 3 are designated 9. By those skilled in the art it will be understood, without a more detailed explanation, that the passage of the areas 9 past the photo sensor 7 will correspond to the passage of a switch actuator past a stationary micro switch, as disclosed in the said earlier application. Preferably the plate 3 is generally transparent while the areas 9 and the parallel lines in area F are non-transparent, but of course also an inverted arrangement could be used, also with respect to the plate 3 being stationary and the photo sensor moving together with the carriage. Furthermore it would be possible to make use of a differentiated light reflection from the detector body rather than a light penetration through the body.

The outermost actuator area 9 corresponds to a 30 cm record, the next area to a 25 cm record and the innermost area 9 to a 17 cm record. Normally the latter record size should be played at a turn table speed higher than for the other sizes, and it is possible, therefore, to make use of an automatic motor speed control adjustment controlled by the detection of the tone arm reaching the inlet position to a 17 cm record. In the said earlier application the speed change is effected by means of an extra switch at this place, but according to the present invention it is possible to avoid the special switch by making use of the detector body 3 and the photo sensor 7.

According to this aspect of the invention advantage is taken of the fact that once the tone arm in the raised position thereof has been brought to pass the edge position of both a 30 cm record and a 25 cm record without the arm 32 having detected the presence of a record, i.e. without the tone arm having been lowered, the tone arm by necessity must be on its way to a 17 cm record, unless there is no record at all on the turn table, and the motor speed adjustment, therefore, may be effected as soon as the intermediate actuator area 9 has left the photo sensor 7 and before this is being reached by the innermost area 9. Between these areas, therefore, there is provided a further actuator area M prepared so as to selectively cause the detector unit to produce a control signal for actuating the motor speed adjusting means, an example of these latter means being described in the said earlier application.

The area M may be prepared in a manner similar to the area F, i.e. so as to have a row of spots or lines of alternating light transparancy, though these spots or lines should be arranged so as to cause the detector unit to receive a pulsating signal of a pulse frequency different from the frequency produced by the area F, in order to enable the detector to effect selective detection. Another possibility is to make the area M entirely non-transparent and to design the detector circuit so as to make it produce a speed adjusting control signal in response to the light sensor 7 remaining non-actuated after the passage of the intermediate actuator area 9 as defined by a delay circuit in the detector unit. Of course, the detector should be made non-responsive to the area M when the tone arm has already been lowered for playing a 30 or 25 cm record. It is deemed unnecessary at this place to describe the arrangements in more detail since it will be clear to any skilled person that selective detection of the passage of the areas 9 and the area M is easily obtainable by simple and reliable detector means.

It will be appreciated that the detector body 3 and the photo sensor 7 will be generally applicable for detecting the position and even the speed of the tone arm whereby mechanical sensor elements can be avoided or reduced in number.

What is claimed is:

1. A phonograph provided with means for detecting the tone arm reaching the outlet groove of a record and for effecting operation control in response to this detection, said detecting means being adapted so as to respond to an increased speed of the tone arm motion relatively to the normal playing speed thereof, characterized in that said detecting means comprise a first detector element arranged so as to be movable with said tone arm and a second detector element arranged in a stationary manner relative to the chassis of the phonograph so as to be passed by said first detector element by the movement of the tone arm at least through the path corresponding to the tone arm moving in the outlet groove of a record, one of said first or second detector elements being constituted by an elongated member extending in the direction of a relative movement between said first and second detector elements, the other of said first or second detector elements comprising a light source for illuminating a narrow area of said elongated element and photoelectric sensing means arranged so as to be operable to detect light from said light source as light reflected by said elongated member or as light admitted through transparent portions thereof, said elongated member having a row of member portions of alternating light reflectability or of alternating light transparence so as to cause said sensing means to receive a pulsating light signal in response to a relative movement between said detector elements, said sensing means being operatively connected to a detector unit including means for producing a control signal for effecting said operation control in response to the pulse frequency of said pulsating light signal increasing above a predetermined value, said elongated member being extended so as to pass along or be passed by said other detector element by the movement of the tone arm through the entire path corresponding to playing of a record of standard size, said elongated member having at least one localizer portion situated so as to be located for cooperation with said other detector element when the tone arm assumes a position corresponding to start playing of said record, said at least one localizer portion being prepared so as to cause the light signal received by said sensing means to change its character in response to the localizer portion being moved into operative engagement with said sensing means, said sensing means being additionally connected with a second detector unit operable to detect said change of light signal character and to produce an output signal in response thereto, said output signal being fed to a control circuit for a tone arm lowering arrangement so as to condition lowering of the tone arm at the correct place to start playing of the record.

2. A phonograph according to claim 1, in which the elongated member is provided with a localizer portion for each of at least two different standard record sizes.

3. A phonograph according to claim 2, in which the elongated member has at least one intermediate portion located respectively between adjacent localizer portions, said intermediate portion being prepared for cooperation with said other detecting element so as to effectively cause generation of a distinct control signal operable in its turn to actuate a motor speed control device so as to automatically adjust the playing speed to the standards of the respective two record sizes.

4. A phonograph according to claim 1, wherein said elongated member moves along a straight linear path.

5. A phonograph record detector for use with a phonograph having a chassis and a tone arm, and for detecting the type of record to be played and the outlet groove of the record being played, comprising:
  a first detector element adapted to be movable with the tone arm and comprising an elongated member extending in the direction of the movement of said first detector element;
  a second detector element arranged in a stationary manner relative to the chassis of the phonograph so as to be passed by said elongated member during the movement of the tone arm at least through the path corresponding to the tone arm moving in the outlet groove of a record, said second detector element comprising a light source for illuminating a narrow area of said elongated member and photoelectric sensing means adapted so as to be operable to detect light which may be transmitted through said elongated member;
  alternating areas of light transparency on said elongated member positioned to receive illumination from said light source only when the tone arm is in the proximity of the outlet groove for causing said sensing means to receive a pulsating light signal in response to the relative movement between said first and second detector elements;
  a detector unit responsive to said sensing means for producing a control signal for effecting end of record operation control in response to the pulse frequency of said pulsating light signal increasing above a predetermined value;
  at least one localizer portion positioned on said elongated member for cooperating with said second detector element when the tone arm assumes a position corresponding to the start of a record, said localizer portion being adapted so as to cause the light signal received by said sensing means to change its character in response to the localizer portion being moved into operative proximity with at least one of said light source and said sensing means;
  a second detector unit responsive to said sensing means to detect said change of light character caused by said localizer portion for producing an output signal in response to said change; and
  a control circuit responsive to said output signal for lowering the tone arm at the correct place to start play of the record.

6. The phonograph record detector according to claim 5, wherein said elongated member moves along a straight linear path.

7. The phonograph record detector according to claim 5, wherein a plurality of localizer portions are provided, each localizer portion corresponding to a different record size.

8. The phonograph record detector according to claim 7, wherein said elongated member further includes at least one intermediate portion for cooperation with said second detector element for causing generation of a signal for adjusting motor speed in accordance with the standard record size to be played.

9. The phonograph record detector according to claim 8, wherein each of said intermediate portions is located respectively between adjacent localizer portions.

10. The phonograph record detector according to claim 9, wherein each of intermediate portions is formed of alternating opaque and transparent areas adapted to provide a different frequency detected by said sensing means.

11. The phonograph record detector according to claim 5, wherein said elongated member further includes at least one intermediate portion for cooperation with said second detector element for causing generation of a signal for adjusting motor speed in accordance with the standard record size to be played.

12. The phonograph record detector according to claim 11, wherein each of said intermediate portions are formed of alternating opaque and transparent areas adapted to provide a different frequency detected by said sensing means.

13. In combination with a phonograph having a chassis and a tone arm, the improvement comprising:
   a first detector element adapted to be movable along with the tone arm at least through the path corresponding to the tone arm moving in the proximity of the beginning edges of records of standard sizes;
   a second detector element arranged in a stationary manner relative to the chassis of the phonograph so as to be passed by said first detector element during the movement of the tone arm when the tone arm is in the proximity of the areas corresponding to the outer edges of records of standard sizes;
   one of the first and second detector elements comprising an elongated member, the other of said first and second detector elements comprising a light source for illuminating a narrow area of said elongated member and photoelectric sensing means arranged so as to be operable to detect light which may be transmitted through said elongated member;
   at least one localizer portion on said elongated member positioned so as to be located for cooperation with said light source and said sensing means when the tone arm assumes a position corresponding to the start of a record, said localizer portion being adapted so as to cause the light signal received by said sensing means to change its character in response to the localizer portion being in operative proximity with at least one of said light source and said sensing means;
   a detector unit responsive to said sensing means to detect said change of light signal character caused by said localizer portion for producing an output signal in response to said change; and
   a control circuit responsive to said output signal for lowering the tone arm at the correct place to start play of the record.

14. The phonograph according to claim 13, wherein a plurality of localizer portions are provided, each localizer portion corresponding to a different record size.

15. The phonograph according to claim 14, wherein said elongated member further includes at least one intermediate portion for cooperation with said second detector element for causing generation of a signal for adjusting motor speed in accordance with the standard record size to be played.

16. The phonograph according to claim 15, wherein each of said intermediate portions is located respectively between adjacent localizer points.

17. The phonograph according to claim 16, wherein each of said intermediate portions is formed of alternating opaque and transparent areas adapted to provide a different frequency detected by said sensing means.

18. The phonograph according to claim 13, wherein said elongated member further includes at least one intermediate portion for cooperation with said second detector element for causing generation of a signal for adjusting motor speed in accordance with the standard record size to be played.

19. The phonograph according to claim 18, wherein each of said intermediate portions are formed of alternating opaque and transparent areas adapted to provide a different frequency detected by said sensing means.

20. In combination with a phonograph having a chassis and a tone arm, the improvement comprising:
   a first detector element adapted to be movable along with the tone arm at least through the path corresponding to the tone arm moving in the proximity of the beginning edges of records of standard sizes, said first detector element comprising an elongated member extending in the direction of movement of said member;
   a second detector element arranged in a stationary manner relative to the chassis of the phonograph so as to be passed by said elongated member during the movement of the tone arm when the tone arm is in the proximity of the areas corresponding to the outer edges of records of standard sizes, said second detector element comprising a light source for illuminating a narrow area of said elongated member and photoelectric sensing means arranged so as to be operable to detect light which may be transmitted through said elongated member,
   at least one localizer portion on said elongated member positioned so as to be located for cooperation with said second detector element when the tone arm assumes a position corresponding to the start of a record, said localizer portion being adapted so as to cause the light signal received by said sensing means to change its character in response to the localizer portion being moved into operative proximity with at least one of said light source and said sensing means;
   a detector unit responsive to said sensing means to detect said change of light signal character caused by said localizer portion for producing an output signal in response to said change; and
   a control circuit responsive to said output signal for lowering the tone arm at the correct place to start play of the record.

21. The phonograph according to claim 20, wherein a plurality of localizer portions are provided, each localizer portion corresponding to a different record size.

22. The phonograph according to claim 21, wherein said elongated member further includes at least one intermediate portion for cooperation with said second detector element for causing generation of a signal for adjusting motor speed in accordance with the standard record size to be played.

23. The phonograph according to claim 22, wherein each of said intermediate portions is located respectively between adjacent localizer portions.

24. The phonograph according to claim 23, wherein each of said intermediate portions is formed of alternating opaque and transparent areas adapted to provide a different frequency detected by said sensing means.

25. The phonograph according to claim 20, wherein said elongated member further includes at least one intermediate portion for cooperation with said second detector element for causing generation of a signal for adjusting motor speed in accordance with the standard record size to be played.

26. The phonograph according to claim 25, wherein each of said intermediate portions are formed of alternating opaque and transparent areas adapted to provide a different frequency detected by said sensing means.

* * * * *